Figure 1:
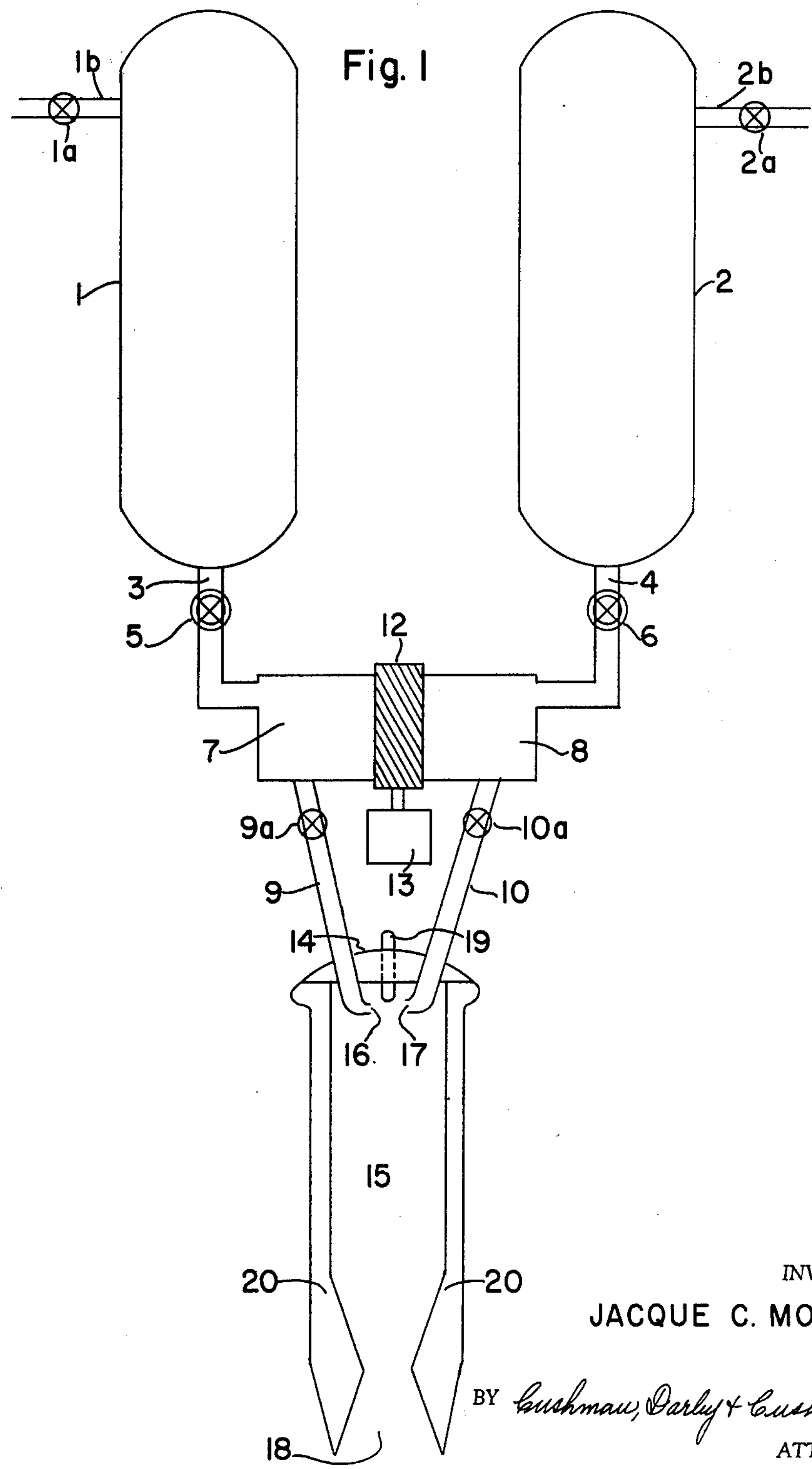

LITHIUM ROCKET PROPELLANTS AND PROCESS FOR USING THE SAME

Filed April 4, 1961 3 Sheets-Sheet 1

INVENTOR
JACQUE C. MORRELL

BY Cushman, Darby & Cushman
ATTORNEYS

LITHIUM ROCKET PROPELLANTS AND PROCESS FOR USING THE SAME

Filed April 4, 1961 3 Sheets-Sheet 2

INVENTOR
JACQUE C. MORRELL
BY Cushman, Darby & Cushman
ATTORNEYS

INVENTOR

JACQUE C. MORRELL

BY Cushman, Darby & Cushman

ATTORNEYS

United States Patent Office 3,153,903 Patented Oct. 27, 1964

3,153,903

LITHIUM ROCKET PROPELLANTS AND PROCESS FOR USING THE SAME

Jacque C. Morrell, 8 Oxford St., Chevy Chase, Md.

Filed Apr. 4, 1961, Ser. No. 100,756
13 Claims. (Cl. 60—35.4)

This invention relates to rocket propellant components and the process by which they are employed in the rocket engine for rocket powered flight.

In general rocket propellants consist of a number of fuels and oxidizers having suitable properties and which have been used by combining them with each other usually in pairs. One class of propellants in which the fuel and oxidizer are combined in a single composition are known as mono-propellants and these may be divided into single and double base compositions. The more generally and widely used class however employ two separate materials i.e. an oxidizer and a fuel and these are referred to in use as bi-propellant rocket systems. The latter are divided into two large classes designating generally their physical properties namely liquid propellants, and solid propellants. The liquid propellants that is the fuel and the oxidizer are stored in containers separately in the rocket system, whereas in the solid propellants the fuel and oxidizer are combined as solids in a single mixture of the two components in suitable shapes or forms for use in the rocket. Various combinations of the two systems while heretofore considered as a possibility have not generally been regarded as practical. The present invention relates particularly to liquid propellants and liquid bi-propellant rocket systems in which both the fuel and the oxidizer are employed in liquid form in the rocket engine system as a self-contained source of rocket power to propel the rocket in flight.

The liquid which I employ is actually a unique composite but stable mixture which is made up by suspending finely divided lithium which possesses high energy and other unique characteristics, and other related lithium alloys, in a selected liquid fuel preferably and generally of the class of liquid hydrocarbons, and preferably selected on a basis of density and other characteristics so that the resulting suspension of lithium and on a nonequivalent basis with related lithium alloys with metals such as magnesium and aluminum as well as others in the liquid hydrocarbon is stable both physically and chemically and possesses superior rocket fuel properties. The oxidizers employed with my fuel are also liquid and may cover a wide range of substances such as liquid oxygen, fuming nitric acid, hydrogen peroxide, liquid ozone, liquid fluorine and others heretofore used successfully in the art but which when combined with my fuel gives results which are much superior to those otherwise obtained on a comparable basis. The bipropellant rocket systems used by me in conjunction with my invention are generally those which employ features which have been fully proven with conventional fuels, or practical variations thereof, but which are likewise on a selected basis. The overall improvement and results obtained comprise a novel bipropellant rocket system process, as well as a highly superior fuel giving greatly improved results when used in connection therewith; all of which will be more fully described and set forth hereinafter.

The rocket in general is a vehicle propelled by a combustion motor or rocket engine, which is self contained with respect to the fuel and oxidizer required for combustion and is thus independent of external means such as the atmosphere for supporting combustion. Rockets depend for their propulsion upon the ejection of hot gases produced by the combustion of the materials carried in the system i.e. the separate propellants consisting of the fuel and oxidizer. The rocket thus produces thrust by the reaction produced by the hot gases resulting from the combustion of the propellants. The latter are fed under pressure to a combustion chamber and are burned therein. The hot gaseous products of combustion escape with high velocity through the nozzle or throat of the chamber and thereby produces a powerful force equal and opposite to that of the jet which propels the rocket engine, and the frame and in general the rocket thus overcoming starting inertia and resistance of the air to sustain flight. The force or thrust produced is generally constant which causes the rocket to be accelerated at a progressively higher rate since the total weight of the vehicle is diminished as the propellants are consumed. The force may be expressed in various units such as pounds of force or rate of doing work such as horsepower, which is a measure of thrust and velocity but the conventional measure for rockets is generally specific impulse i.e. the number of pounds of thrust produced per pound of propellant consumed per second. However there are other features of efficiency of bi-propellants which will also be referred to below.

It is important to note that there are great differences between rocket engines and other types of internal combustion engines the principal one being that the former carry their own source of oxygen (as well as fuel), and therefore are independent of the atmosphere, and of altitude constituting in this respect an ideal power plant for use beyond the earth's atmosphere.

In its simplest form the rocket comprises the rocket engine, which generally refers to the combustion chamber and nozzle but which for present purposes may comprise as a rocket engine system the source of fuel and oxidizer i.e. the propellant tanks and the supply of the same together with feed means and accessories. The source and supply of fuel and oxidizer vitalize the process of power production in the combustion chamber and may therefore be considered an essential part of the rocket engine system. The air frame which generally includes all dead weight refers principally to the supporting structure, tubular housing and the like. The simple rocket is generally balanced for flight, but without guidance means. Control of the flight path of a rocket propelled vehicle may be obtained by various methods including swiveling the engine itself. If the system includes guidance means so that its trajectory or flight path may be altered by a mechanism within the rocket it is generally referred to as a guided missile. The latter generally contains electronic and optical devices, radar, television etc. for observation. Both may contain a war head. Generally anything beyond the bare essentials of flight is referred to as payload.

I may apply my invention to all of the above variations and may employ all of the known devices and refinements in connection therewith including multistage systems to obtain higher velocities and range. However in its essence my invention relates more specifically to the improved composite fuel described herein and to its application to improving the efficiency of the process of rocket engine systems; and more particularly of liquid bi-propellant rocket engine systems.

The elements of the rocket engine system required to carry out the process of my invention as well as the latter will be described in greater detail in connection with the drawings and the illustrative figures. However in general they comprise a source and supply of my composite lithium or lithium alloy hydrocarbon fuel, and a separate supply of liquid oxidizer of the type referred to. The fuel and oxidizer are generally stored in tanks in the system, and gas pressure or pumps (and means for actuating the latter) to force the fuel and oxidizer on a controlled basis through jets into the combustion chamber wherein the mixture is ignited by ignition means to produce hot gases of combustion which are passed at high velocity through the nozzle or throat of the combustion chamber producing a high velocity jet stream which produces a thrust or force by reaction for propulsion of the vehicle. As pointed out previously the source and supply of the fuel and oxidizer vitalize the process of power production in the combustion chamber (and its utilization by the rocket for flight), and my special fuel particularly has an integral part in the improvements obtained in the process.

Having described my special fuel and the rocket engine and power plant system operation in which it may be employed in a general way, I shall proceed to a detailed description and discussion of the liquid fuel components of the propellant and the manner in which they are selected to prepare the composite fuel. The latter as pointed out is a composite consisting of a stable suspension of lithium and other but non equivalent substances such as the alloys of lithium with magnesium, aluminum and other metals in which the lithium is present in major amounts and the other metals in minor amounts, in a hydrocarbon liquid or chemically stable derivative thereof. The lithium and its alloys are in a finely divided condition. In this connection I may refer also to my copending application Serial No. 100,755 which relates to suspension of finely divided lithium hydrides in special hydrocarbons to produce rocket fuels.

Paraffin hydrocarbons are preferred because of complete non-reactivity with the lithium metal as well as facilitating comparable densities or specific gravities. For example in this class I may select the following hydrocarbons: propane specific gravity (as a liquid) or density 0.509; the butanes sp. g. 0.576 and the pentanes 0.630. These may also include the hexanes sp. g. 0.663 and higher particularly in admixture to arrive at an overall specific gravity of about 0.55 to 0.60, (preferably in the lower range) lithium metal being 0.53. In such a mixture the butanes and the pentanes would predominate, especially since propane is normally a gas, and the hexanes are relatively high in specific gravity for the present objective. Isobutanes and the isopentanes are somewhat lower in specific gravity than the corresponding normal hydrocarbons and are therefore preferable in the mixture. Lithium is the lightest of all the metals (in fact of any other solid) and while there may be a slight tendency for the metallic lithium to float in the heavier hydrocarbons such a system would be relatively stable. Moreover this tendency could be offset by increasing the propane fraction since the hydrocarbons may be used in the rocket system under pressure in the gas pressure type of feed system. For example using equal parts of propane and the butanes would give an exact equivalency in specific gravity to metallic lithium and the butanes alone would approximate this. Moreover more of the pentanes and hexanes and even the heptanes may be used by adding a surface active suspending agent to stabilize the suspension as hereinafter described.

In the latter connection i.e. the use of a surface active suspending agent, I may also employ aviation gasolines sp. g. about 0.68 to 0.72 and some motor gasoline sp. g. about 0.72 to 0.76 together with the aforesaid lighter hydrocarbons using in this case minor amounts of propane if desired, and thus facilitating handling at normal pressures. Cycloparaffins e.g. cyclohexane 0.778 and cycloheptane 0.810 and the aromatic hydrocarbons of the benzene series while somewhat high in gravity are relatively chemically stable and may be blended in the mixture especially where the surface active agents are used as hereinafter described for example to a blend of about 0.6 to 0.7 sp. g. more or less. Olefin hydrocarbons corresponding to the paraffins cited above, while tending to react and less desirable may be used under some conditions in minor proportions.

The use of lithium alloys i.e. alloys of lithium with other metals (or generally with other elements) permits a high degree of flexibility in my invention in retaining the unique properties of lithium generally as a rocket fuel while at the same time modifying its overall physical properties i.e. of the suspended material so as to have available a wide range of hydrocarbon liquids in which the lithium alloys may be suspended in the hydrocarbons and the densities matched on an approximately equivalent basis.

The metals (and/or elements generally) which I employ fall into two classes: Light metals, or elements, selected from the class consisting of magnesium, aluminum and beryllium which in themselves are suitable as rocket fuels on a non equivalent basis. Also in this general class is boron which while not properly classified as a metal is suitable for my purpose. These lighter metals also serve the principal purpose of modifying the specific gravity of the lithium metal and rendering it more stable chemically without substantially affecting its efficiency as a rocket fuel (and may improve it in some cases) and moreover they facilitate its use since the alloys, using the metals added in relatively minor proportions, permit the use of a wide range of hydrocarbons especially including those named above as well as the commercial products and fractions, gasoline (including aviation and motor gasoline) as well as light and heavy kerosenes and the jet fuels or blends thereof without the use of suspending agent. For example the metals named have the following specific gravities: lithium 0.53; magnesium 1.74; beryllium 1.82 and aluminum 2.70. Boron has a specific gravity of 2.32. By alloying 10% of these metals with lithium the resulting specific gravities are: Mg-Li sp. g. 0.651; Be-Li sp. g. 0.658; Al-Li sp. g. 0.747 and B-Li sp. g. 0.709. The whole range of paraffin hydrocarbons referred to above (eliminating most of the propane) as well as higher hydrocarbons may be used e.g. a mixture of butanes (sp. g. 0.576), pentanes (0.630), hexanes (0.663), heptanes (0.684) and octanes (0.707) in equivalent amounts show an average specific gravity of 0.652 which is equivalent in specific gravity to the first two alloys mentioned and in finely divided form they would form a permanent suspension in these hydrocarbon mixtures without the use of a surface active suspending agent. The two latter alloys (0.71) and (0.75) would produce the same result in an aviation gasoline and a motor gasoline respectively; and if aluminum were used in such an alloy to the extent of 5% its specific gravity would be 0.64 and it could be used in the first series.

Similarly if magnesium and beryllium were used to the extent of 15% in alloy with lithium the resulting specific gravities would be respectively about 0.711 suitable for permanent suspensions in aviation gasoline because of substantially equivalent specific gravities. In like manner a 20% alloy of magnesium or beryllium specific gravity about 0.78 would be suitable in jet fuels JP2, JP3 and JP4 and others or a blend of gasoline and kerosene falling within these ranges. A 15% alloy of aluminum with lithium has a specific gravity of 0.85 which would fall in the range of the heavier kerosenes and the diesel fuels as well as domestic burning oils. A 25% alloy of magnesium or beryllium would likewise fall in this class; while a 15% to 20% alloy of aluminum with lithium would cover the whole range of this class of hydrocarbons from 0.85 to 0.95 specific gravity which would include all of the heavy distillates from petroleum above, as well as aromatic hydrocarbons and light and heavy solvent naphtha (a coal tar distillate) and special products such as the hydrogenated naphthalenes referred to of specific gravity 0.895–0.971 (described below) and all of these or mixtures may be used for suspensions without any other additive.

In addition to the lighter metals named above which have considerable rocket fuel value (and in the case of beryllium and boron are superior) I may also employ heavier metals in very small amounts for the principal purpose of modifying the physical and chemical properties of the lithium imparting a higher specific gravity and an appreciable increase in chemical stability to facilitate handling the lithium. All of these alloys are used in finely divided condition.

These metals, which I refer to as the heavier (or heavy metals) with respect to those mentioned above cover a wide range of which I shall mention a few only as illustrative with their respective specific gravities: Tin (5.75); cadminum (8.64); zinc (7.14); lead (11.34); thallium (11.85); copper (8.92) and silver (10.5).

In the cases of these heavier metals the addition of from one to five percent will give the necessary density or specific gravity to cover and adapt to the whole range of commercial products and fractions referred to herein; while less than three percent is required for those in the density class of silver and lead. Other metals may of course be employed, but it is believed that the examples cited above illustrate the principles of my invention.

With regard to the hydrocarbons generally, the paraffins including all of the liquid series named above as well as others of the liquid series generally are preferred because of their complete non-reactivity with lithium and its alloys. Next in order are the cycloparaffins and the aromatics. Olefins are least desirable, as under some conditions they may react with lithium but may be present in minor amounts. Certain hydrogenated hydrocarbons such as the hydronaphthalenes e.g. tetra and deca hydronaphthalenes (commercially known as tetralin and decalin) and amyl naphthalene may also be employed. The properties of these compounds: decalin, deca hydronaphthalene $$(C_{10}H_{18})$$

sp. g. 0.895; tetralin, tetra-hydronaphthalene ($C_{10}H_{12}$) sp. g. 0.971 and amyl naphthalene ($C_{15}H_{18}$) sp. g. 0.965, as well as heavy solvent naphtha from the distillation of coal tar (sp. g. 0.870 to 0.880) make them particularly attractive for blends in connection with suspensions of heavier lithium alloys generally.

The paraffin hydrocarbons may vary over the whole range of liquid hydrocarbons such as the very light hydrocarbons mentioned above as well as heavier ones which may be present in major amounts in the commercial products gasoline, naphthas, kerosene, the various jet fuels (JP1 to JP6 inclusive), diesel and domestic fuels and other higher boiling distillates all of which may be used either as such or perferably in various blends to meet the density and other requirements of my special composite lithium fuel as hereinafter described. The cycloparaffins occur mainly in the naphthene base oils or as narrow fractions of individual compounds, and are likewise suitable on a selected basis. The aromatic hydrocarbons derived from coal tar distillates, benzene, toluene, xylenes, cumene, are especially adapted because of density and specific gravity especially in admixture such as solvent naphtha which is a commercial fraction, and the middle oils. Some petroleum fractions also contain aromatic hydrocarbons. Varous mixtures of these hydrocarbonsa my be employed also and it is to be noted that in the prevailing commercial natural petroleum products noted above from the various crude sources that the paraffins usually predominate, the naphthenes and aromatics are present to an extent dependent on source and processing, while the olfins (which are least desirable but can be used in minor amounts) are present only in cracked products: The other hydrocarbons are present of course in the cracked distillates, which may be used, preferably by blending with straight run petroleum or coal tar distillate products. In general all of the commercial products referred to above including the very light hydrocarbons (which may be obtained from natural gas or natural gasoline and other sources) aviation and motor gasolines, kerosene, the jet fuels, and the heavier distillates may be employed for my special lithium fuel as they are sold in the open market, or blends thereof with each other and the other products named above so that the density or specific gravity of the hydrocarbons may be the equivalent or approximately of the same order as lithium metal or of the group of lithium alloys employing all of these hydrocarbons on a selected or matched density or specific gravity basis. Normally the blends can be made on the basis of the hydrocarbon products named above to be of equivalent specific gravity to the lithium and its alloys, but variations of about +0.1 while not desirable and generally avoidable may be allowable. However less than 0.1 variation in density is preferred, and exact equivalences may be obtained as described below, and quite readily to within ±0.05. Also in some cases which are less useful as described where it is found desirable to use surface active materials to assist stability the variations may be somewhat greater.

The commercial products gasoline, naphtha, the jet fuels (JP1, JP2, JP3, JP4, JP5, and JP6), kerosene, diesel fuels and burner distillates and heavier distillates such as gas oil become heavier in the ascending order shown. The heavier oils have less heating value by weight, but more by volume, than the lighter oils e.g. kerosene has about 3% less B.t.u. per lb. than gasoline but about 10% more by equal volume and the others correspond. JP3 which is between gasoline and kerosene has a somewhat lower boiling range and a higher vapor pressure than kerosene. The jet fuels generally fall in between kerosene and gasoline in properties. The heat content of paraffin fuels such as gasoline is about 19,000 B.t.u. per lb. (which is slightly above that of the lithium metal), kerosene runs about 18,000, whereas the aromatic hydrocarbons with less hydrogen e.g. benzene runs about 17,200 B.t.u. per lb. The various products are also characterized by boiling range e.g. motor gasoline IBP<200° F. (usually 10% off at about 130° F.) end boiling point, 400° F., and vapor pressure about 8 lb. Reid, while kerosene may be characterized in boiling range varying from (*a*) 300° F. to 5250 F. or (*b*) from 450° F. to 530° F. and a flash test of 140° F. The properties of JP3 would lie between gasoline and kerosene e.g. 300° F. to 460° F. Other commercial distillate fractions may of course be employed.

The above data are not given to precisely identify these products, as specifications very considerably and are readily available, but are shown for comparative purposes. All of these products may be used particularly if blended to arrive at suitable specific gravities.

As an example kerosene has all of the advantages as a rocket fuel as gasoline with none of its operating disadvantages. Jet fuel JP4 (which is a low vapor pressure JP3) is superior in some respects to JP1 (similar to kerosene) but has less heat energy on a volumetric bais. Relatively small differences of the order shown while important when choosing between these fuels to be used alone, become of lesser importance than the selection of a hydrocarbon mixture e.g. obtained by blending, which has the proper density characteristic, (and also preferably of paraffinic type) to make a stable suspension of lithium and its alloys as described which will not settle and which contributes the necessary rocket fuel characteristics.

The density (which is the weight per cubic centimeter), or the specific gravity (which is the relative weight of a definite volume compared with water at the same temperature) of the hydrocarbon mixture varies with the fraction increasing generally with increasing boiling points. These mixtures contain a very large number of individual hydrocarbons; However from the practical viewpoint the commercial fractions are preferred because of availability. Although it is a simple matter to blend any fraction in refinery practise to obtain the desired specific gravity.

From the viewpoint of the selection or use of a hydrocarbon product to make up a stable suspension of the various lithium alloys in hydrocarbon liquids, aviation gasoline or motor gasoline having densities of about 0.72 to 0.74, in the lower range, or kerosene or the heavier jet fuels JP1 (or a blend of these) are satisfactory in the higher range, the latter having densities or specific gravities of 0.791 to 0.796 while the other jet fuels which are intermediate in range show densities as follows: JP2—0.771 to 0.783; JP3—0.752 to 0.785, and JP4 falls between these ranges. JP5 and JP6 are variations in kerosene-gasoline blends. A selection of any product shown above from aviation gasoline through motor gasoline and the jet fuels and kerosene or a blend of any of them could be matched in density by an alloy of the light metals e.g. magnesium and aluminum with lithium to make the suspension which would be stable without the addition of any stabilizing additive. It may also be stated that additions of small amounts of heavier distillates and/or of lighter distillates (e.g. gasoline to improve ignition) could be made to the suspension to correct for small differences or to improve certain properties such as ignition or if the specific gravities were not equivalent. Heavier kerosene distillates (cut for example to 43 AP gravity) correspond to a density or sp. g. of 0.811, and domestic fuels (burning oils) having a density or sp. g. range of 0.850 to 0.855 and diesel oils from 0.839 to 0.860, and in general all such heavier oils may be blended with motor gasoline sp. g. about 0.74 in various proportions to arrive at the equivalent density of any lithium alloy of the lighter metals or the proportions of the latter may be changed to match the density of the hydrocarbon mixture for example 2 parts of heavy kerosene to one of gasoline or 1 part of gas oil or diesel oil to two of gasoline, are approximately equivalent in density to a 20% alloy of either magnesium or beryllium and lithium.

Also some of the lower members of the cycloparaffin series have densities as follows: cyclohexane 0.778, cycloheptane 0.810 and cyclo-octane 0.8304. These could be used directly or blended with each other and would be suitable as suspending agents for the foregoing 20% magnesium or beryllium alloy with lithium. Moreover the naphthenic base crude oil or petroleum fractions could be cut to order to the specific gravity of any lithium alloy and make stable suspensions therewith.

The physical basis for preparing the suspension of lithium and the lithium alloys is based on selection of the hydrocarbon primarily on specific gravity considerations and emphasizing the use of commercial products as discussed above as well as the other groups of hydrocarbons mentioned.

A description of the properties of lithium and of the important alloying metals, especially the light ones, used in connection with my invention, and the methods of preparation of the suspension in addition to that already given is shown below.

Lithium metal is made by electrolysis generally of lithium chloride. It is the lightest of all the metals, in fact of all the solid elements and is next to hydrogen and helium of all the elements in the periodic system. It has a density of 0.534 at 20° C. and an atomic weight of 6.94. It melts at 354° F. It reacts vigorously with water, to produce hydrogen, so that its hydrocarbons must be free, or reasonably so, of water. It is extremely active and precautions must be taken in storing and handling it to avoid fire hazards. Also the material must be handled with caution by personnel and all protective devices employed for flammable materials must be employed. Grinding the material (or otherwise reducing) or melting and atomizing to fine powder (or to a finely divided condition) as required in the present invention must be done in a moisture free and preferably in an inert atmosphere such as dry nitrogen and preferably in argon or helium, etc. and in an enclosed system. The same holds for filling containers.

In some cases the lithium may be made directly as a hydrocarbon dispersion in situ, usually employing a suspending agent; but the density relationship of the hydrocarbon medium and the lithium as pointed out is the important and determining factor to produce a stable suspension which depends according to my invention upon the correlation of the densities of external and internal phases. The bulk material while requiring care is much easier to handle than the finely divided material. The finely divided lithium preferably from about several thousandths of a millimeter in diameter or less to about 0.1 mm. more or less, the finer material being preferred, may be transferred to the hydrocarbon suspending agent or medium e.g. using the lighter hydrocarbons for lithium; and gasoline, kerosene or a jet fuel or the other hydrocarbons of the appropriate density for the alloys and the operation is carried out preferably in an inert atmosphere by stirring or agitating the finely divided lithium or lithium alloy into the hydrocarbon liquid. The smaller and more uniform range of sizes of the lithium and its alloys is preferred, but the upper ranges and even larger will be stable also because of the density relationship. The hydrocarbon liquid is added in an amount to render the system fluid and so that the lithium is in the internal phase; about 55 to 60% of liquid being required, although more may be added. It is also emphasized that various blends of hydrocarbons as shown above may be employed.

The metals which I prefer to use as alloying agents on a non-equivalent basis for lithium to increase density and specific gravity and decrease activity to facilitate handling which at the same time contribute to rocket fuel efficiency are aluminum, magnesium, beryllium and the element boron. The other metals referred to herein are employed in very small amounts mainly to increase density. Some of the important factors of these elements which have a bearing on the present subject aside from the densities which have been given above are the calorific values which follow: aluminum, 13,320 b.t.u.'s per lb.; magnesium, 10,810; beryllium, 26,950; boron, 23,280. Lithium has a calorific value of 18,450 b.t.u.'s per lb. which is about that for gasoline. These metals have a higher combustion chamber temperature than gasoline even though the calorific values are less in some cases and the oxygen (or air) fuel ratios are low and oxygen or air specific impulse are relatively high in comparison with gasoline all of which are favorable to their use as a rocket fuel component.

I may also in some cases employ additions of surface active materials to assist in stabilizing the suspensions. These are generally of the type which if used in emulsion systems they would be soluble in the oil and the latter would be in the continuous phase. They may also be found in the class of hydrophobic esters, and are of a non-ionic type. Among this class are some of the fatty acid esters of the polyvinyl alcohols such as the glyceryl oleates, stearates and laurates. Also certain sterols and sterol esters, as well as pentaaerythritol dioleate and related soluble esters referred to as pentamuls may be used. Certain sterol esters of the type of cholesterol and lanolin have also been found useful in this connection, as well as compounds of the lecithin type. In another generalized class of suspending agents, to assist in special cases, where they are found desirable, are the soaps (i.e. the salts of the higher fatty acids) of the divalent metallic elements e.g. the oleates, stearates, palmitates, etc. of the alkaline earth metals, calcium, magnesium and borium. Corresponding lithium soaps on the one hand and aluminum soaps e.g. the octoate may also be used as examples.

These materials referred to above may be used when found necessary to the extent of a fraction of one percent up to several percent by weight and will not react in these dilutions with lithium. Normally my suspensions of lithium and its alloys particularly the latter do not require these additives, but they may assist even where used in very small amounts in special cases e.g. where light fractions are employed such as gasoline or other fractions the specific gravity of which are substantially higher than that of the lithium; or as an assistant in "wetting" the solid material with the oil if this should be necessary. I may also in special cases if desired employ relatively high concentrations of petroleum jelly or the soaps named in the oil to obtain stability by viscosity effects but this is considered only in unusual cases.

A principal requirement is that the systems must be fluid. Concentrations or in general amounts of lithium and its alloys up to 50% and above may be added, which in the present type of system where the specific gravity of the two phases i.e. the external or continuous hydrocarbon liquid and the dispersed lithium or its alloys are approximately the same, both by weight and volume, the latter having particular reference to the wetted material. For the same volume the weights of the alloys are of course greater than the lithium metal.

The amounts of lithium or its alloys which may be added to the hydrocarbon liquid depend on the degree of subdivision and uniformity of size; and these factors in turn determine void space which is likewise a factor. Moreover an excess of liquid must be present to obtain fluidity of the system which is necessary. On this basis the percentage of solid finely divided lithium or of the alloys which may be added on a weight basis in practise would be from about 40% to about 50% of the resulting suspension. There is of course no lower limit and I may in some special cases add from several percent up to ten percent although generally these low concentrations would not be employed. Intermediate amounts for example from about 20% to about 40% could serve the useful purpose of substantial improvements in specific impulse and efficiency of performance while substantially maintaining the fluidity of the hydrocarbon liquid. The excess of liquid required to change from a stiff sludge like system to a fluid system is a relatively minor amount. While no difficulty in initial wetting of the powdered or finely divided lithium or of its alloys is usually encountered, this may be overcome in special cases by adding a small fraction of one percent of the surface active materials referred to above.

Exact maximum amounts of lithium and its alloys in various stages of subdivision which may be added to any particular hydrocarbon fraction or blend to produce any desired degree of fluidity and/or stability may in any event be readily determined by trial; and adjustments easily applied. The general principles described above which apply to the preparation of the lithium suspensions also apply quantitatively to the amounts of lithium alloys. The total weight of the latter suspended will of course be greater than that for the lithium, but so will the total weight of the hydrocarbons per unit volume in the case of the alloys.

The actual process of making up the suspension of the lithium (as well as the alloys mentioned herein) is simply to stir the finely divided powdered material into the liquid hydrocarbons (or make a paste therewith and dilute with the hydrocarbons) and agitate or stir. The operation is carried out preferably in an inert atmosphere as mentioned previously.

According to my invention I may utilize all of the finely divided high energy solid fuels i.e. lithium metal and the alloys of the same with aluminum, magnesium, beryllium and of boron and the others mentioned above (none of which are in any sense equivalent to the others from the viewpoint of specific physical and chemical properties, or cost and availability, etc.). In all cases they are suspended in finely divided form in a selected fraction of hydrocarbon liquids to produce a stable non-setting composite high energy liquid fuel: and as described they are used in combination with various liquid oxidizing compounds or agents of the class of liquid oxygen, liquid ozone (or mixtures), white and red fuming nitric acid, hydrogen peroxide (generally of high concentrations), liquid fluorine and various derivatives thereof e.g. chlorine mono and tri-fluoride nitrogen oxides, fluorides and other liquid oxidizing and similar agents generally known to the art. These oxidizing agents are now used conventionally and I contemplate employing all of these which have advantages and may be employed with and react with hydrocarbons in the absence as well as in the presence of lithium and its alloys; although the latter in all cases renders the hydrocarbons more reactive. In some cases also the presence of the suspended lithium gives a hypergolic action i.e. by auto ignition in the combustion chamber. In all cases the improved results in rocket and rocket engine efficiency are obtained with my composite fuel compared with the same hydrocarbons used alone and the composite fuels are substantially non-settling both in storage and in use because of the substantially equivalent densities or specific gravities of the lithium and alloys of the same and their respective hydrocarbon fractions in which they are suspended.

The operation of the process of my invention is carried out generally as described above and provides for two separate propellants consisting of a liquid fuel comprising a selected hydrocarbon liquid in which lithium or the alloys referred to is suspended in a stable suspension (which is brought about mainly by consideration of the specific gravities of the two phases) and a liquid oxidizer of the type already referred to. These propellants are contained in separate tanks and are mixed only after separate injection into the combustion chamber; and otherwise are not allowed to come into contact with each other. The fuel and oxidizer may be fed separately to the combustion chamber by means of pumps or by gas pressure in the tanks.

Figure 2:
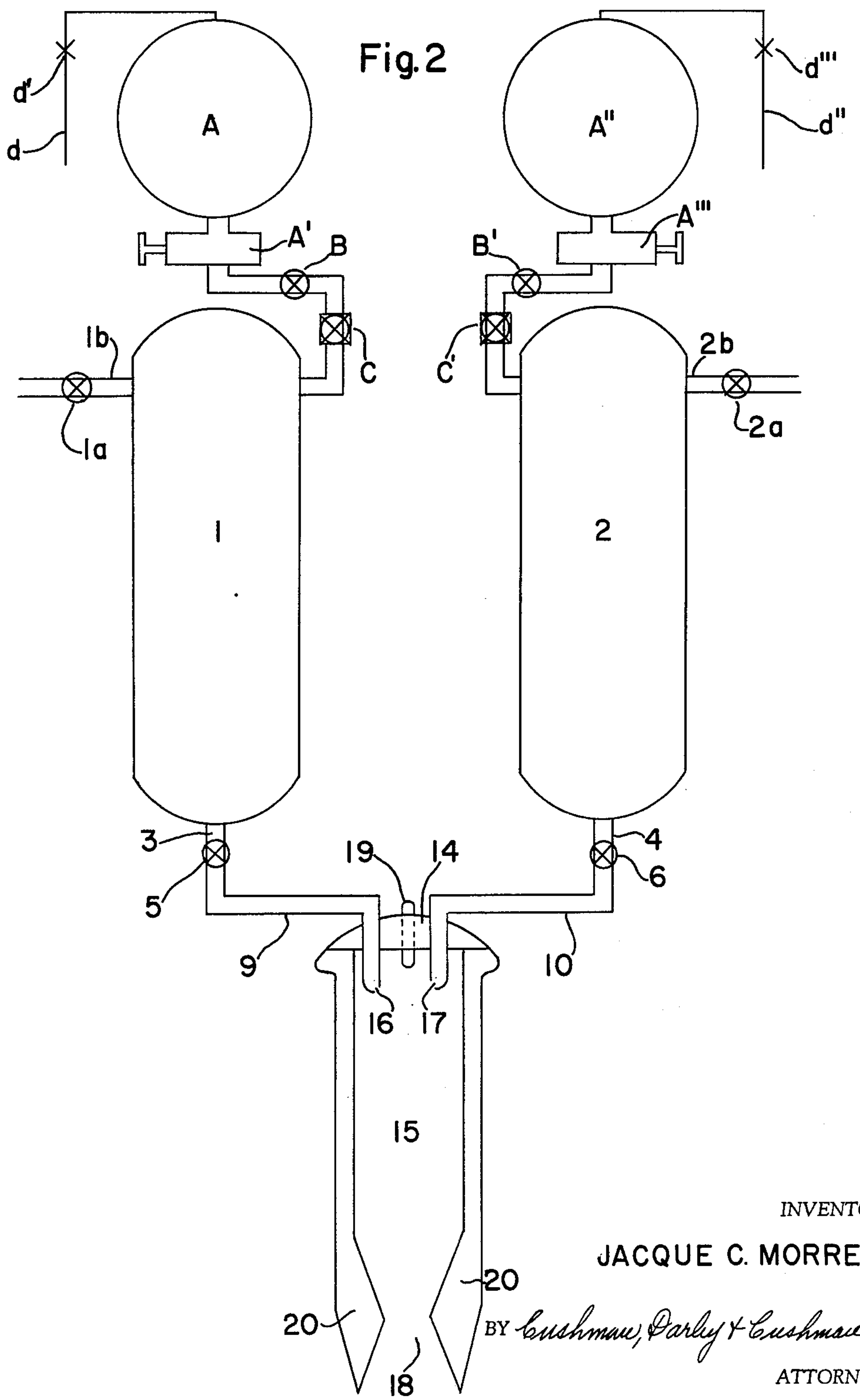
Figure 3:
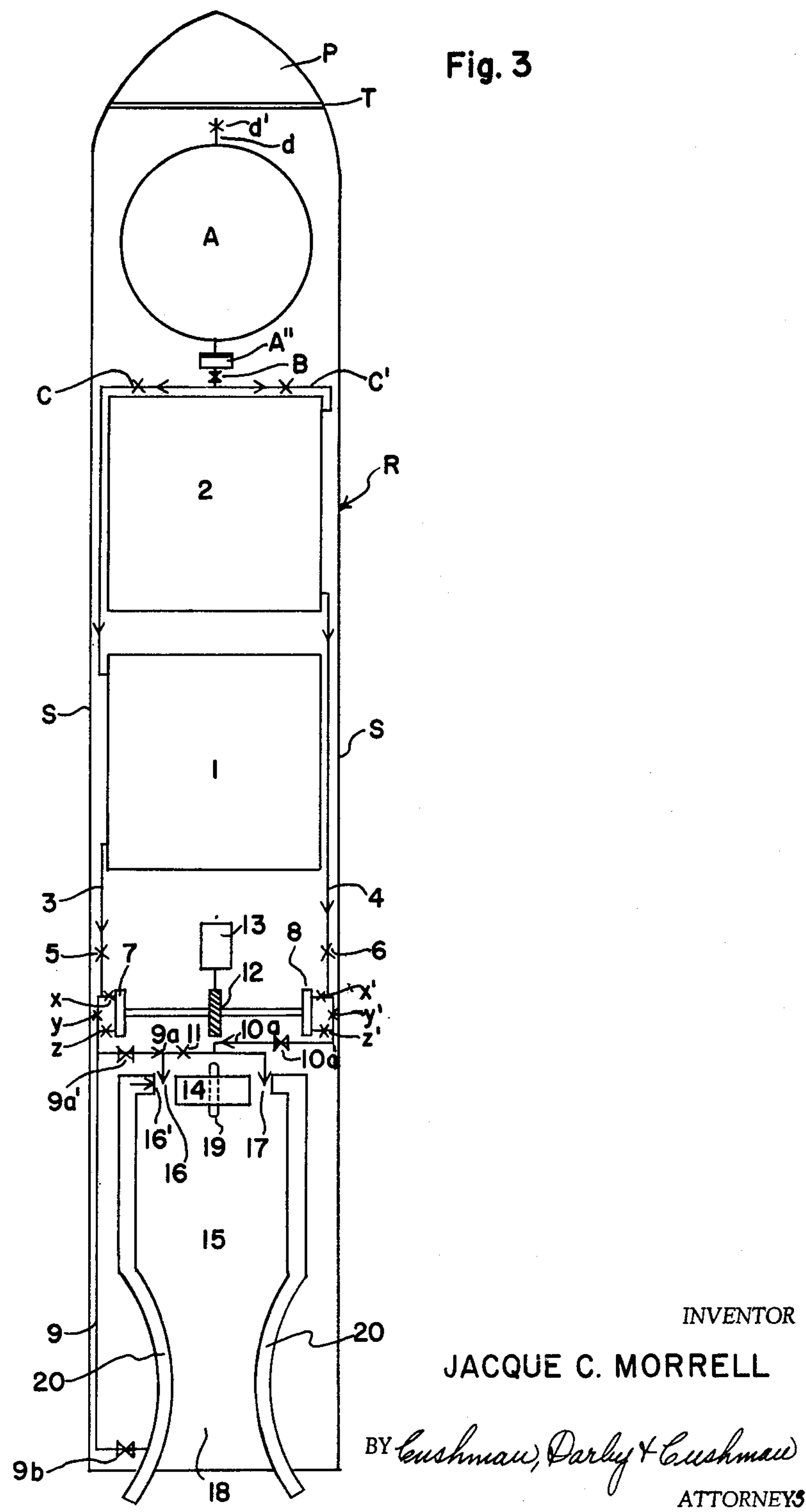

The FIGURES 1, 2, and 3, shown in the drawings are schematic and illustrative only but may be used to illustrate the operation.

Referring to FIG. 1 the special liquid composite fuel of the process is stored in tank or chamber 1, and the liquid oxidizer in tank 2. Valves and lines **1*a* and 1*b* and 2*a* and 2*b* provide for filling tanks 1 and 2 respectively with fuel and oxidizer. Line 3 provides for the withdrawal of fuel from tank 1 and line 4 for the withdrawal of oxidizer from tank 2. The rate of withdrawal of each liquid is controlled by main fuel control valve 5 and main oxidizer valve 6, located on the lines 3 and 4 respectively. The fuel passes through the pump 7 from which it is forced through line 9 with control valve 9*a*; simultaneously the oxidizer passes through pump 8, from which it is forced through line 10 controlled by valve 10*a*. The pumps 7 and 8 which are kept completely sealed off from each other (but are correlated to supply a definite proportion of oxidizer to fuel) are operated by the hot gas turbine 12 supplied from the gas generator 13. The latter may be a small combustion chamber, for example for a portion of the main propellants, or steam and or gas generator for example from the decomposition of hydrogen peroxide, or in any conventional manner. Lines 9 and 10 pass through the injector head 14 and terminate in the jets 16 and 17 respectively where the fuel and oxidizer are intimately mixed in the combustion chamber 15 and are ignited by suitable ignition means (e.g. an electrical plug or hot plug generally selected from a number of such devices in conventional use) shown as 19 and located in the injector head. The hot gases from the combustion chamber emerge as a high velocity stream and source of power through the chamber nozzle or throat 18**.

The combustion chamber is usually provided with double walls with a space 20 between the same to permit circulation of a portion of one of the propellants to cool and protect the chamber walls from overheating and the propellant so circulated is returned to the main stream. This is illustrated in FIG. 3.

FIG. 2 shows most of the essential features shown in FIG. 1 the principal difference being that a gas pressure feed system replaces the pump system shown in FIG. 1. The gas pressure feed system referred to as a gas pressurization system provides for feeding gas under suitable pressures from the storage spheres A and A″ to the propellant storage tanks in such manner so as to maintain a controlled flow and pressure on each of the propellant storage tanks. The gas employed must be chemically inert to the propellants (both fuel and oxidizer) and generally nitrogen, argon and helium are employed for this purpose; and I may also employ hydrocarbon gases such as methane, ethane and propane under pressure in A in connection with the fuel feed. Provision is made for introducing the gas under pressure into the spheres through line and valves *d* and *d'* and *d''* and *d'''*. The gas is delivered from the gas storage sphere A through regulator valves A' and A''' and through flow control valves B and B' and check valves C and C' to the propellant tanks 1 for fuel and 2 respectively for oxidizer where it pressurizes the space above the liquids in these tanks. The pressure regulators A' and A''' maintain the pressure and the flow uniform as predetermined for each liquid and is conventionally used for this purpose. Valves B and B' to start and stop the flow of gas are operated by remote control and are generally of the solenoid electrically operated type. The check valves C and C' are required to prevent the vapors from the fuel tank and propellants generally from mixing in the gas feed system. The remainder of the system in FIG. 2 is substantially the same as for FIG. 1 excepting that no pumps and turbine etc. are required. Lines 1*b* and 2*b* and 1*a* and 2*a* are used for filling tanks 1 and 2 respectively. The fuel passes through line 3 controlled by valve 5 and the oxidizer through line 4 controlled by valve 6 into and through lines 9 and 10 respectively and through the injector head 14 to the jets 16 and 17 into the combustion chamber 15 where they are ignited by hot plug 19. The hot gases of combustion pass through nozzle or throat 18 as previously described.

As shown in FIGURE 2 and as described in connection with FIGURE 1—the combustion chamber is usually provided with double walls with a space 20 between the same to permit circulation of a portion of one of the propellants to cool and protect the chamber walls from overheating and the propellant so circulated is returned to the main stream.

In both FIGURES 1 and 2 as well as in FIG. 3 to be described, and in general for all liquid propellant rocket systems solenoid valves of various types and remote control valves generally are used to control the main functions of rocket engines, employing various types e.g. one type for control of gas pressurization and another to control the action of the main fuel and the main oxidizer valves, and generally the latter are opened and closed at the same time. The pressure tank system requires high pressure in the propellant tank, and in this respect the pump system has an advantage. In both systems safety and proper flow balances and means to control same are provided and these include pressure regulators, remote control valves, check valves, and in some cases proportioning devices for fuel and oxidizer and various devices and refinements in conventional use for proper operation, and it is contemplated that I may use such devices in the operation of the process of my invention. It is also to be understood that the FIGURES 1 and 2 are illustrative only.

FIGURE 3 likewise is for illustrative purposes, and shows schematically an assembly which includes both the gas pressure and pump feed systems. It is presented mainly to illustrate the housing and framework of the rocket in relation to the rocket engine and the flow of propellants therein. It is of course to be understood that the two feed systems namely the gas pressure and pump systems are not used simultaneously.

Referring to FIG. 3 the rocket R consists of the shell or frame which houses the propellant supply tanks and rocket engine with auxiliary parts, and the payload compartment P and tray or plate T. The payload compartment may include guidance or observational instruments, warhead or equipment as desired other than the rocket proper. In the schematic arrangement shown gas may be delivered under any suitable pressure as in FIG. 2 from storage sphere A through regulator A'' and remote control flow valve B and check valves C and C' and passes into fuel storage tank 1 and into oxidizer tank 2 exerting pressure to force fuel and oxidizer through lines 3 and 4 respectively controlled by valves 5 and 6. When the gas pressure system is used the fuel valves *x* and *z* are closed and valve *y* is open; and similarly valves *x'* and *z'* in the oxidizer line are closed and *y'* is opened. Under the conditions the pump system is isolated, and fuel may pass directly through line 9*a* controlled by valve 9*a'* through the injector head 14 and to jet 16 and enter combustion chamber 15 or alternatively the fuel may pass through line 9 controlled by valve 9*b* into space 20 between the walls of the combustion chamber to cool the same and to emerge through jet 16' into chamber 15. The oxidizer flow passes simultaneously through line 10*a* controlled by valve 10*a'* passing through injector head 14 and terminating in jet 17 in the combustion chamber 15. Alternatively when valves *x* and *z* and *x'* and *z'* are opened and valves *y* and *y'* are closed the fuel may pass through pump 7 and the oxidizer through pump 8 (12 and 13 representing the turbine and gas generator shown in FIG. 1) flowing to the combustion chamber as already described above through the appropriate lines. In either case the mixture of fuel and oxidizer is ignited by hot plug 19 in combustion chamber 15 and hot combustion gases exit from nozzle or throat 18. Valve 11 provides safety in keeping fuel and oxidizer separate until they emerge from the separate jets into the combustion chamber.

RESULTS AND GENERAL EXAMPLES

One of the important standards of measurement in improved efficiency in the use of rocket fuels is the specific impulse i.e. the thrust in pounds per pound of fuel per second, measured usually in seconds. Specific combinations of fuels and oxidizers give different results which in general are not predictable. For example, on an approximate basis, gasoline with fuming nitric acid shows a specific impulse of about 240 seconds; with 90% hydrogen peroxide it shows about 250 seconds and with liquid oxygen, gasoline shows about 260 seconds, all at the same chamber pressure. With ozone or fluorine as oxidizers the specific impulse of gasoline may exceed 300 seconds. Different fuels also show different results among themselves, not generally predictable because of many variables, for example, gasoline is higher than ethyl alcohol using either hydrogen peroxide or liquid oxygen as an oxidizer; and further ammonia gives slightly lower results than gasoline using fuming nitric acid as an oxidizer, it is quite superior when liquid fluorine is employed in both cases; although both are high. Hydrazine, a compound (somewhat chemically related to ammonia, but highly toxic) gives a higher specific impulse than any of the foregoing fuels using the same oxidizer. Liquid hydrogen and liquid fluorine give the highest specific impulse of any fuel-oxidizer combination, but are technically most difficult to handle in use since liquid hydrogen boils at −423° F. and liquid fluorine at −367° F., and the latter is both highly toxic and corrosive. Other examples could be cited but it is believed that the foregoing illustrates difficulties in attempts to predict as well as to use these materials.

Many factors influence the specific impulse which while not a basis for prediction give some indications and show a direction, especially where several factors for a given material cooperate with rather than opposing each other. Among the favorable factors which definitely affect specific impulse are high calorific value (B.t.u.'s per lb.); high combustion chamber temperatures (which do not necessarily follow calorific values); low molecular weights of the original materials and of the combustion products. As examples hydrogen has an extremely high calorific much higher than gasoline (perhaps higher than any other substance) but it shows a relatively low combustion chamber temperature (much lower than gasoline), either with oxygen or fluorine. Apparently the high calorific value together with the low molecular weight (the lowest) are sufficient to overcome, in this case, the low chamber temperature. The importance of the latter is that the hotter the gases the larger the volume occupied or the higher the pressure or both which results in greater thrust through the constant diameter nozzle of the combustion chamber. According to theory combustion chamber temperature is related to the breaking of valence bonds in the fuel and oxidizer during combustion and the formation of more stable bonds in the resulting gaseous products. It is known that in some reactions like the formation of steam from the combustion of hydrogen and oxygen consume energy in the decomposition of the resulting water at a definite temperature, and thus limit the combustion temperature. Low molecular weights of fuel and oxidizer and the resulting combustion products favor high specific impulse because of the large volume to weight relationship of the gaseous products. Whatever the particular explanation may be when two or more factors which strongly favor specific impulse are present at the same time the results as in the case of hydrogen may offset an unfavorable factor and vice versa, but in any event the factors must be determined.

With regard to the above general discussion it is noted and I have observed in connection with the present invention that while lithium (18,400 B.t.u. per lb.) and the alloys have calorific values of the same order of kerosene, jet fuel and gasoline i.e. of hydrocarbons generally, their combustion temperatures are very much higher than the hydrocarbons by several thousand degrees. Moreover lithium has an atomic weight of 6.94 the third lightest element (after hydrogen and helium) and the molecular weight of both lithium and lithium alloys are correspondingly low so that in balance, they are good high energy fuel, i.e. they are practically equivalent to the hydrocarbons in one important respect and in two other important respects are greatly superior and impart their superior quality to the composite mixture. However heretofore no one has shown the manner in which these factors could be used to overcome certain objectionable properties and the hazards attending the same, as well as to convert them into a physical form which can be practically applied and used as a superior rocket fuel such as has been accomplished by my novel product and process.

Rocket performance characteristics such as payload, range and size and weight of the rocket depend to some extent upon, and in general are related to all of the factors which enter into the specific impulse of which the thrust is an important factor. The latter is maintained uniform in operation, with constant consumption of propellants i.e. the fuel and oxidizer. As the latter are consumed the total load decreases and acceleration increases. The frame weight, as well as the rocket engine component parts, remains constant and improvements in payload depend not only on increasing the specific impulse as such, but any reduction in initial propellant and dead weight load which will permit substitution of payload will improve performance and efficiency for example reducing the oxidized requirements.

I have found in connection with my invention that I obtain a very substantial decrease in oxidizer requirements, for which direct substitution of payload may be made; in addition to increased combustion chamber temperatures and an increase in specific impulse resulting in a substantial overall rocket engine and rocket efficiency when I employ my novel composite fuel consisting of a stable suspension of the lithium and its alloys with aluminum, magnesium, and beryllium (as well as with boron) suspended in a selected hydrocarbon or a mixture of the same as described. Moreover my novel composite lithium rocket fuel is not only more efficient, but is stable and non-settling in storage and use and reduces the overall hazards in handling.

The above findings in connection with my invention demonstrate not only the superiority of the lithium and its alloys as a high energy fuel but also disclose a novel composite fuel product and method of preparing the same so as to impart to it superior qualities for handling and use as a rocket fuel, as well as disclosing the manner in which they are employed i.e. the novel process by which these unique and superior rocket fuels (which have never heretofore been used in this manner) are used to obtain the advantages of their superior properties.

The conditions which may prevail in the combustion chamber of the rocket (without cooling) are temperatures from about 4000° F. to 8000° F. more or less; and somewhat higher dependent on propellant combinations; with pressures of from 300 p.s.i. to 500 p.s.i. and above dependent on several factors.

SPECIFIC EXAMPLES

*Example 1*

A mixture of propane sp. g. 0.509, butanes sp. g. 0.58 including a major amount of isobutanes sp. g. 0.56 and pentanes sp. g. 0.63 having in about equal amounts an average specific gravity of 0.543 (maintained under sufficient pressure to avoid vaporization) was mixed with finely divided lithium sp. g. 0.53 in a propane atmosphere (an inert gas to lithium used generally) excluding air using about 55%–60% of the liquid hydrocarbon mixture and about 40%–45% (and above) of finely divided lithium—agitating the mixture in the closed system. The resulting mixture is quite fluid. The lithium suspension in the light hydrocarbons was stable with regard to settling in handling and in storage in a closed system. The specific impulse of the hydrocarbons alone with oxygen is about 260 seconds (pounds of force per pound of fuel per second); the specific impulse of the mixture is 285 seconds under the same conditions, showing an increase in specific impulse of 9.6%. The oxidizer requirement for the composite fuel (referred to as the ratio of oxygen to fuel) is about 28% less than that required for the hydrocarbons alone. Since the oxidizer requirement generally may be as much at 30% to 50% of the total load weight of the rocket a saving in oxidizer of this magnitude for the composite fuel indicates a much higher payload potential or range or both and in general together with the high increase in specific impulse, a new high efficiency rocket fuel.

*Example 1a*

Use of other oxidizers like fuming nitric acid and hydrogen peroxide while showing lower specific impulses show equivalent increases in the same and proportional reduction in oxidizer requirements.

*Example 2*

A mixture of butane, isobutane and pentanes (including normal and iso) and a small amount of hexanes with some propane, all stable unler atmospheric conditions having a specific gravity of 0.60. A small amount of less than 0.5% of aluminum octoate is added as stabilizer (oil soluble metals soaps and the other stabilizers used generally) and 40% by weight of finely divided lithium added to 60% by weight of the hydrocarbon. The resulting suspension is stable and does not settle in use or storage. When somewhat larger amounts of the lithium were added e.g. between 45 and 50% to obtain a somewhat thick fluid mixture no stabilizer is required; and even less may be added without the use of stabilizer, without undue operating difficulties. The specific impulse of the hydrocarbons is about 260 seconds and of the above mixture i.e. the lithium-hydrocarbon mixture (with oxygen) is about 284 seconds, an increase of about 9.2%. The reduction in oxilizer requirement for the composite fuel is about 26% less than for the hydrocarbon fuel.

*Example 2a*

When somewhat larger amounts of the lithium e.g. 45% to 50° (and even less) by weight of the 0.60 sp. g. light hydrocarbon mixture employed in Example 2 the resulting somewhat thick fluid mixture required no stabilizer to prevent settling and shows even higher efficiency e.g. specific impulse and oxidizer saving than Example 2.

*Example 3*

An alloy of magnesium and lithium containing 10% of the former with a specific gravity of 0.651 is added in finely divided form to a mixture of hydrocarbons containing approximately equal amounts of butanes, pentanes, hexanes, heptanes and octanes with a specific gravity of 0.65. The suspension of the product is perfectly stable without additive and non-settling using varying amounts of the lithium-magnesium alloy of from 10% to 45% by weight of the composite lithium hydrocarbon mixture. The increase in specific impulse (with oxygen) of the composite mixture, using about 40% of lithium magnesium alloy, is 9.0% and the reduction in oxidizer requirement has been found to be about 25%.

*Example 3a*

A light aviation gasoline specific gravity of about 0.71 is mixed with a lithium magnesium alloy in finely divided form containing 15% of magnesium having a specific gravity of about 0.71. Various mixtures of the hydrocarbon liquid and the alloy containing from 10% to 45% are found to be stable and non-settling without the use of additive. A mixture containing 40% of the lithium-magnesium alloy and 60% of the hydrocarbons by weight shows increase in specific impulse over the hydrocarbons (with oxygen) of about 8.5% and a reduction in oxidizer requirement of about 23%.

*Example 3b*

The use of an alloy of magnesium and lithium with 20% of the former produces an alloy of about 0.78 sp. g. and when mixed in finely divided form in a jet fuel of 0.78 specific gravity gives stable suspensions (without the use of additives and without settling over the whole range of mixtures e.g. from about 10% up to about 45% to 50% of the alloy. The increase in specific impulse and reduction in oxidizer is somewhat less (about 8%) than in Example 3*a* but is still very high. Reduction of the magnesium content to 17.5% gives an alloy of sp. g. about 0.74 and permits admixture of the finely divided lithium-magnesium alloy with motor gasoline to produce results slightly superior to the foregoing (3*b*) with 40% of the alloy but otherwise comparable to it and to 3*a*.

*Example 3c*

Reproduction of Examples 3, 3*a* and 3*b* substituting beryllium for magnesium gives similar specific gravity relationships for the alloys in the ranges shown, and similarly permits stable suspensions of the finely divided alloys to be formed in the corresponding hydrocarbons shown in these examples. The hydrocarbon-beryllium alloy mixtures however have considerably higher specific impulses and about the same oxygen/fuel ratios. It is noted in this connection that the calorific value of beryllium is the highest of all the components or elements dealt with in this invention being about 27,000 B.t.u. per lb. as compared to 19,000 for the hydrocarbons and 18,450 for lithium; which accounts for the high specific impulse.

*Example 4*

An alloy of lithium and aluminum containing 10% of aluminum equivalent in specific gravity to a motor gasoline of specific gravity 0.75 when suspended in finely divided form in the gasoline e.g. from about 10% to 45% by weight of the alloy gives permanent suspensions without an additive. The specific impulse with oxygen of a mixture containing 40% of the lithium aluminum alloy in the gasoline shows an increase of about 8.5% over the motor gasoline alone which is about 260 seconds under the same conditions and a reduction in oxidizer requirement of about 24% compared with the gasoline, with consequent overall greater efficiency in power payload and range.

*Examples 4a and 4b*

An alloy of lithium and aluminum containing about 4% of the latter gives results in all respect employing the same mixture of hydrocarbons and the same amount of the alloy (namely 40%) and 60% of the hydrocarbons suspended therein as those shown in Example 3 for the lithium-magnesium alloy used therein containing 10% of magnesium. The specific impulse increases and oxidizer reductions are approximately equivalent in both cases and the specific gravities of the alloys and hydrocarbons also approximately equivalent, with permanent suspension in all cases without the use of additives. Similarly when using about 7% of aluminum in an aluminum-lithium alloy in finely divided form suspended in a light aviation gasoline (both of specific gravity about 0.7), permanent suspensions were obtained without the use of additive (at all ranges e.g. 10% to 45% of the alloy) the specific impulse of the composite fuel shows an increase of about 8.5% over that of the hydrocarbons, and an oxidizer reduction of about 23%, the same in all respects as in Example 3*a* above.

*Examples 4c and 4d*

An alloy of aluminum with lithium containing 15% of aluminum has a specific gravity of about 0.85 and when suspended in heavy kerosene and the diesel oils of like specific gravity are found to give permanent suspensions without the use of an additive in the whole range of suspensions e.g. from 10% to 45% of the alloy (and above). The specific impulse (with oxygen) increase of a 40% suspension is found to be about 8% (the kerosene under like conditions showing about 250 seconds) with a reduction in oxygen amount of about 17% similar to Example 3*b* above.

(4*d*) An alloy containing 20% of aluminum is found suitable for use with the heavier diesel oils and burner oils when suspended in finely divided form, and of heavy solvent naphtha and of the hydrogenated naphthalenes, as well as blends (adding a small amount of gasoline in all cases to improve ignition) to form permanent suspensions without the use of additives. The specific impulse (with oxygen) for these suspensions are only slightly less than in Example 4*c* above with comparable oxidizer reduction and in general overall efficiency.

It is noted in connection with all of the above examples that (as mentioned in connection with Example 3*c*) beryllium has the highest calorific value (27,000 B.t.u. per lb.) of all the elements in connection with my invention. Boron has a calorific value of 23,280 and shows very high specific impulses, next to beryllium. It is used specifically in connection with suspensions in about the same proportions as aluminum and in the same types of hydrocarbons but shows better efficiency. Aluminum and magnesium are generally preferred on the basis of cost and availability and while the calorific values are lower than the others they show high combustion temperatures as well as high specific oxygen impulses and in addition to facilitating permanent suspensions make a positive contribution to efficiency.

*Example 5*

The heavier metals cadmium, zinc and tin, and lead and silver on the high end give the following results when alloyed in very small amounts e.g. for lead and silver from about 1 to 3% more or less cover the whole range of specific gravities to match all the hydrocarbon fractions shown in the above examples. The others, cadmium, zinc and tin are used in the same manner from 1 to 5% to cover the range of products. Cadmium and lead have the lowest melting point of the series. In all cases using all of these metals in varying proportions the suspensions are permanent without additives and the resulting composite fuels showed increases of the order and only slightly less (e.g. in 40 to 45% by weight of the finely divided alloys) of the corresponding hydrocarbons containing lithium contributing about an 8% to 9% increase in specific impulse and a decrease of oxidizer requirement of the order of about 20% to 25%.

The foregoing specific examples as well as the other examples shown herein of the application and use of my invention are not in any sense to be construed as limiting the same as they are only illustrative and there are many variations of the same within the broad scope and spirit of my invention.

I claim:

1. A high energy rocket propellant composition which comprises a substantially stable suspension of a lithium metal alloy in finely divided form in the internal phase in a hydrocarbon liquid in the external phase, said alloy being characterized by a major amount of lithium metal and a minor amount of a metal selected from the group consisting of magnesium and aluminum.

2. A high energy rocket propellant composition which comprises a substantially stable suspension of lithium metal alloy consisting of a major amount of lithium metal and a minor amount of a metal selected from the group consisting of magnesium and aluminum in finely divided form in the internal phase in a hydrocarbon liquid in the external phase, said composition being further characterized in that any difference in specific gravity which may exist between the said hydrocarbon liquid in the external phase and the said lithium alloy in the internal phase is less than about 0.1.

3. A high energy rocket propellant composition which comprises a substantially stable suspension of lithium metal alloy consisting of a major amount of lithium metal and a minor amount of a metal selected from the group consisting of magnesium and aluminum in finely divided form in the internal phase in a hydrocarbon liquid having a specific gravity in the range between about 0.50 and about 0.70 in the external phase, said composition being further characterized in that any difference in specific gravity which may exist between the said hydrocarbon liquid in the external phase and the said lithium metal in the internal phase is less than about 0.1.

4. A high energy rocket propellant composition which comprises a substantially stable suspension of lithium metal alloy consisting of a major amount of lithium metal and a minor amount of a metal selected from the group consisting of magnesium and aluminum in finely divided form in the internal phase in a hydrocarbon liquid selected from the group consisting of paraffinic, naphthenic, aromatic and hydrogenated naphthalene hydrocarbons having a specific gravity in the range of 0.55 and 0.97 in the external phase, said composition being further characterized in that any difference in specific gravity which may exist between the said hydrocarbon liquid in the external phase and the said lithium alloy in the internal phase is less than about 0.1.

5. A high energy rocket propellant composition which comprises a substantially stable suspension of lithium metal alloy selected from the group of metals consisting of magnesium and aluminum and alloyed with lithium metal in finely divided form in the internal phase in a hydrocarbon liquid as the external phase of the said rocket propellant composition.

6. A high energy rocket propellant composition which comprises a substantially stable suspension of lithium alloy selected from the group of metals consisting of magnesium and aluminum alloyed with lithium in an amount up to about 25% of said metals in finely divided form in the internal phase in a hydrocarbon liquid in the external phase, said composition being further characterized in that any difference in specific gravity which may exist between the said hydrocarbon liquid in the external phase and the said lithium alloy in the internal phase is less than about 0.1.

7. In a liquid propellant rocket process to produce rocket engine power which comprises forcing a liquid fuel propellant from a bulk supply of the same to a rocket engine combustion chamber with a constricted nozzle, simultaneously forcing a liquid oxidizer propellant reactive with said liquid fuel propellant from a separate bulk supply to said combustion chamber wherein said fuel and said oxidizer are ignited and undergo combustion and from which the hot gases of comubustion pass through the said nozzle to produce rocket engine power whereby the rocket is propelled in flight, the improvement which comprises utilizing a stable suspension of a substance containing a lithium metal alloy in finely divided form consisting of a major amount of lithium metal and another metal selected from the group consisting of magnesium and aluminum dispersed in a hydrocarbon liquid as the said fuel and the source of power.

8. In a liquid propellant rocket process to produce rocket engine power which comprises forcing a liquid fuel propellant from a bulk supply of the same to a rocket engine combustion chamber with a constricted nozzle, simultaneously forcing a liquid oxidizer propellant reactive with said liquid fuel propellant from a separate bulk supply to said combustion chamber wherein said fuel and said oxidizer are ignited and undergo combustion and from which the hot gases of combustion pass through the said nozzle to produce rocket engine power whereby the rocket is propelled in flight, the improvement which comprises utilizing a stable suspension containing an alloy with a major amount of lithium metal together with another metal from the group consisting of magnesium and aluminum in finely divided form in a hydrocarbon liquid as the said fuel and source of power.

9. In a liquid propellant rocket process to produce rocket engine power which comprises forcing a liquid fuel propellant from a bulk supply of the same to a rocket engine combustion chamber with a constricted nozzle, simultaneously forcing a liquid oxidizer propellant selected from the group consisting of liquid oxygen, liquid ozone, white fuming nitric acid, red fuming nitric acid, nitric oxides, hydrogen perioxide, liquid fluorine, chlorine mono-fluoride, chlorine trifluoride and nitrogen fluorides from a separate bulk supply to said combustion chamber wherein said fuel and said oxidizer are ignited and undergo combustion and from which the hot gases of combustion pass through the said nozzle to produce rocket engine power whereby the rocket is propelled in flight, the improvement which comprises utilizing a stable suspension containing an alloy of lithium in major amounts together with another metal from the group consisting of magnesium and aluminum in finely divided form in a hydrocarbon liquid as the said fuel and source of power.

10. In a liquid propellant rocket process to produce rocket engine power which comprises forcing a liquid fuel propellant from a bulk supply of the same to a rocket engine combustion chamber with a constricted nozzle, simultaneously forcing a liquid oxidizer propellant reactive with said liquid fuel propellant from a separate bulk supply to said combustion chamber wherein said fuel and said oxidizer are ignited and undergo combustion and from which the hot gases of combustion pass through the said nozzle to produce rocket engine power whereby the rocket is propelled in flight, the improvement which comprises utilizing a stable suspension containing an alloy of lithium metal in major amounts with another metal selected from the group consisting of magnesium and aluminum in finely divided form in a hydrocarbon liquid as the said fuel and source of power.

11. In a liquid propellant rocket process to produce rocket engine power which comprises forcing a liquid fuel propellant from a bulk supply of the same to a rocket engine combustion chamber with a constricted nozzle, simultaneously forcing a liquid oxidizer propellant reactive with said liquid fuel propellant from a separate bulk supply to said combustion chamber wherein said fuel and said oxidizer are ignited and undergo combustion and from which the hot gases of combustion pass through the said nozzle to produce rocket engine power whereby the rocket is propelled in flight, the improvement which comprises utilizing a stable suspension containing an alloy of lithium metal in major amounts with another metal selected from the group consisting of magnesium and aluminum in an amount not to exceed about 25% of the same in finely divided form in a hydrocarbon liquid as the said fuel and source of power.

12. In a liquid propellant rocket process to produce rocket engine power which comprises forcing a liquid fuel propellant from a bulk supply of the same to a rocket engine combustion chamber with a constricted nozzle, simultaneously forcing a liquid oxidizer propellant reactive with said liquid fuel propellant from a separate bulk supply to said combustion chamber wherein said fuel and said oxidizer are ignited and undergo combustion and from which the hot gases of combustion pass through the said nozzle to produce rocket engine power whereby the rocket is propelled in flight, the improvement which comprises utilizing a stable suspension containing an alloy of lithium metal in major amounts with another metal and another metal selected from the group consisting of magnesium and aluminum in finely divided form in a hydrocarbon liquid selected from the group consisting of paraffinic, aromatic, naphthenic and hydrogenated naphthalene hydrocarbons as the said fuel and source of power.

13. In a liquid propellant rocket process to produce rocket engine power which comprises forcing a liquid fuel propellant from a bulk supply of the same to a rocket engine combustion chamber with a constricted nozzle, simultaneously forcing a liquid oxidizer propellant reactive with said liquid fuel propellant from a separate bulk supply to said combustion chamber wherein said fuel and said oxidizer are ignited and undergo combustion and from which the hot gases of combustion pass through the said nozzle to produce rocket engine power whereby the rocket is propelled in flight, the improvement which comprises utilizing a stable suspension of a substance containing lithium metal and another metal selected from the group consisting of magnesium and aluminum in finely divided form selected from the group consisting of an alloy of lithium metal in major amounts with another metal in a hydrocarbon liquid in the specific gravity range of about 0.55 and about 0.97 as the said fuel and source of power.

References Cited in the file of this patent

UNITED STATES PATENTS 2,771,739 Malina et al. ----------- Nov. 27, 1956

OTHER REFERENCES

Klein: SAE Journal, December 1947, pages 22 to 28 (TL 1.56).

Leonard: Journal of the American Rocket Society, No. 72, December 1947, pp. 10 to 23, TL780.A8.